(12) United States Patent
Rautschek et al.

(10) Patent No.: US 7,081,275 B2
(45) Date of Patent: Jul. 25, 2006

(54) SILICON RESIN-BASED BINDING AGENTS AND THEIR USE IN METHODS FOR PRODUCING MINERAL FIBER BASED SHAPED BODIES

(75) Inventors: Holger Rautschek, Nünchritz (DE); Günter Beuschel, Nünchritz (DE); Bernward Deubzer, Burghausen (DE); Karin Haneburger, München (DE)

(73) Assignee: Wacker Chemie GmbH, Munich (DE)

( * ) Notice: Subject to any disclaimer, the term of this patent is extended or adjusted under 35 U.S.C. 154(b) by 0 days.

(21) Appl. No.: 10/471,954

(22) PCT Filed: Mar. 28, 2002

(86) PCT No.: PCT/EP02/03576

§ 371 (c)(1),
(2), (4) Date: Sep. 15, 2003

(87) PCT Pub. No.: WO02/081568

PCT Pub. Date: Oct. 17, 2002

(65) Prior Publication Data

US 2004/0087719 A1 May 6, 2004

(30) Foreign Application Priority Data

Apr. 4, 2001 (DE) ................................. 101 16 810

(51) Int. Cl.
*B05D 3/02* (2006.01)
*C08L 83/00* (2006.01)

(52) U.S. Cl. ...................... 427/387; 524/588; 524/837; 528/14

(58) Field of Classification Search ............ 528/12–19; 524/588, 858, 266, 268
See application file for complete search history.

(56) References Cited

U.S. PATENT DOCUMENTS

| 4,529,758 A | * | 7/1985 | Traver .......................... 524/43 |
| 4,935,484 A | * | 6/1990 | Wolfgruber et al. .......... 528/34 |
| 4,988,470 A | | 1/1991 | Demlehner et al. |
| 5,039,724 A | | 8/1991 | Demlehner et al. |
| 5,045,231 A | * | 9/1991 | Braun et al. ................... 516/66 |
| 5,591,505 A | | 1/1997 | Rusek, Jr. et al. |
| 5,708,113 A | * | 1/1998 | Beuschel et al. ............. 528/15 |
| 2003/0152708 A1 | * | 8/2003 | Kron et al. ............... 427/385.5 |

FOREIGN PATENT DOCUMENTS

| DE | 1 126 467 | 3/1962 |
| DE | 27 56 503 | 9/1978 |
| DE | 43 92 078 | 9/1995 |
| DE | 197 40 757 | 3/1999 |
| EP | 0 342 519 | 11/1989 |
| EP | 0 366 133 | 5/1990 |
| EP | 0 0 403 347 | 12/1990 |
| JP | 5-179598 A | * 7/1993 |
| JP | 7-247434 A | * 9/1995 |

OTHER PUBLICATIONS definition of "emulsion" taken from the online version of Hawleys Condensed Chemical Dictionary, 14th editor.*
Römp Chemielexikon, 9th Edition, G. Thieme Publishing House, Stuttgart, NY, 1990, p. 1587.
Ullmann's Encyclopedia of Industrial Chemistry, 5th Ed., vol. A11, p. 23.
English Derwent Abstract AN 1990-378053 (51) corresp. to EP 0 403 347 A1.
English Derwent Abstract AN 1993-386076(48) corresp. to DE 43 092 078 T1.
English Derwent Abstract AN 1978-4958A(28) correspond. to DE 2 756 503.
English Derwent Abstract AN 1999-205857(18) corresp. to DE 197 40 757 A1.

* cited by examiner

*Primary Examiner*—Marc S. Zimmer
(74) *Attorney, Agent, or Firm*—Brooks Kushman P.C.

(57) ABSTRACT

Aqueous organopolysiloxane compositions containing a dispersed solid organopolysiloxane resin bearing both alkoxy and hydroxy radicals, a condensation catalyst, and a wetting agent are suitable for use as binders for the preparation of structures based on mineral fibers.

19 Claims, No Drawings

SILICON RESIN-BASED BINDING AGENTS AND THEIR USE IN METHODS FOR PRODUCING MINERAL FIBER BASED SHAPED BODIES

BACKGROUND OF THE INVENTION

1. Field of the Invention

The invention relates to siloxane suspensions and their use as binders for producing moldings based on mineral fibers, and also to the resultant fiber structures.

2. Description of the Related Art

Moldings composed of mineral fibers are composite materials composed of fibers and of a binder which links the fibers together so that the desired shape can be retained. They are widely used as materials, and in particular as insulating materials in the construction industry and in engineering. The production of products of this type has been known for a long time. The general method of producing these products is to apply the binder solution by spraying immediately after withdrawing of the mineral fiber from the melt, and molding the product in subsequent steps, and curing it in an oven. This process is mostly a fully continuous process and is therefore cost-effective. The binders used in this process usually comprise aqueous solutions of phenol-formaldehyde. condensates, which may have been modified with amino resins or with urea.

Although these mineral fiber products bonded with phenolic resin are widely used, e.g. in the construction industry for thermal insulation and solid-borne sound insulation, they also have a number of disadvantages which exclude certain uses. The main disadvantage is low heat resistance. In addition to this, relatively large amounts of formaldehyde and phenols are emitted during the production process, and when the finished product is subjected to thermal stress decomposition products of the organic resin used are liberated and cause pollution or even a hazard to health. The content of organic binder also frequently leads to some degree of combustibility or flammability, the result being non-compliance with some fire-protection requirements. This means that products produced using organic resins cannot generally be used under conditions where the insulating materials have to be non-flammable, or where they are subject to thermal stress. This is the case, for example, during use in fire-protection equipment or in household devices, such as stoves.

The proposal put forward to solve this problem is the use of low-melting thermoplastic glasses, e.g. those based on borate or phosphate, as binder, e.g. as disclosed in U.S. Pat. No. 5,591,505. A disadvantage of this binder is the fact that the binder does not crosslink, and therefore that the structure produced therewith from mineral fibers loses its mechanical strength, or indeed its shape, when exposed to heat. Silicone resins are known as binders for high-temperature-resistant products, for example electrical insulating materials based on mica. In this connection, reference may be made by way of example to DE-A 11 26 467. EP-A 342 519 also proposes using silicone resin emulsions instead of the phenolic resin solution as binders for producing structures based on mineral fiber. However, this provides only a partial solution to the problems of emissions. Firstly, these silicone resin emulsions comprise organic emulsifiers which, when exposed to heat, decompose to form undesirable gases. Secondly, the emulsions proposed also comprise liquid low-molecular-weight siloxanes, for example as disclosed in EP-A 366 133, which, either as they stand or via cleavage of alkoxy groups during the curing process cause emissions.

When moldings are produced from mineral fibers with pulverulent binders, it is also always necessary to use a specific mixture of previously prepared fiber product with binders, and it is also necessary to use high pressures during the process. In this connection, reference may be made by way of example to DE-A 27 56 503, EP-A 403 347 and DE-A 43 92 078. Use of conventional pulverulent binder is not generally possible in the context of the conventional product technology explained above applicable to structures composed of mineral fibers. The use of alkoxysilanes in a mixture with colloidal particles, e.g. silica sol, the materials known as nanocomposites, permits continuous production of moldings from mineral fibers, these being stable even at relatively high temperatures and having improved fire performance. However, this process has the major disadvantage that, in particular during the production of the mineral fiber products, the alkoxy groups of the silanes used produce relatively large amounts of alcohol by cleavage, because the silane mixtures used are composed of more than 75% by weight of alkoxy groups. These emissions pose a fire risk, and are also hazardous to health and to the environment. This requires purification of the resultant exhaust air, at considerable cost.

SUMMARY OF THE INVENTION

Thus, the present invention provides resin binders which generate no volatile organic compounds during application, which exhibit excellent binding and superior heat resistance and generate little in the way of emissions at high temperatures. The binder consists of aqueous organopolysiloxane compositions containing a dispersed solid organopolysiloxane resin bearing both alkoxy and hydroxy radicals, a condensation catalyst, and a wetting agent, and are suitable for use as binders for the preparation of structures based on mineral fibers.

The invention provides organopolysiloxane suspensions composed of (A) 100 parts by weight of a pulverulent organopolysiloxane resin composed of units of the general formula

$$R_a Si(OR^1)_b(OH)_c O_{(4-a-b-c)/2} \quad (I)$$

where

R may be identical or different and is monovalent, SiC-bonded, where appropriate substituted, hydrocarbon radicals, $R^1$ may be identical or different, and is an alkyl radical, a is 0, 1, 2, or 3, b is 0, 1, 2, or 3, and c is 0, 1, 2 or 3, with the proviso that the sum a+b+c is ≦3, and that the organopolysiloxane resin composed of units of the general formula (I) has at least one alkoxy radical and at least one hydroxy radical, (B) from 0.05 to 5 parts by weight of a condensation catalyst, (C) from 0 to 4 parts by weight of an inorganic anti-settling agent, (D) from 0.01 to 4 parts by weight of a wetting agent, (E) from 100 to 10 000 parts by weight of water, and (F) from 0 to 10 parts by weight of additives, selected from adhesion promoters, polyorganosiloxanes, other than those composed of units of the formula (I), preservatives, dyes, and fragrances.

The radical R is preferably monovalent, SiC-bonded hydrocarbon radicals having from 1 to 18 carbon atoms, unsubstituted or substituted with amino groups, with hydroxy groups, with carboxy groups, with epoxy groups, with mercapto groups, or with halogen atoms, and is particularly preferably hydrocarbon radicals having from 1 to 6 carbon atoms, in particular the methyl radical.

Examples of radical R are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals, such as the n-octyl radical, and isooctyl radicals, such as the 2,2,4-trimethylpentyl radical; nonyl radicals, such as the n-nonyl radical; decyl radicals, such as the n-decyl radical; dodecyl radicals, such as n-dodecyl radical; octadecyl radials, such as the n-octadecyl radical; cycloalkyl radicals, such as the cyclopentyl, cyclohexyl, cycloheptyl radical, and methylcyclohexyl radicals; alkenyl radicals, such as the vinyl, 1-propenyl, and 2-propenyl radical; aryl radicals, such as the phenyl, naphthyl, anthryl and phenanthryl radical; alkaryl radicals, such as o-, m-, p-tolyl radicals; xylyl radicals and ethylphenyl radicals; and aralkyl radicals, such as the benzyl radical, or the α- and the β-phenylethyl radical.

The radical $R^1$ is preferably alkyl radicals having from 1 to 4 carbon atoms, particularly preferably the methyl or ethyl radical.

Examples of radicals $R^1$ are the examples of alkyl radicals given above for R.

a preferably has average values of from 0.8 to 1.5, particularly preferably from 0.9 to 1.1, in particular from 0.98 to 1.02.

b preferably has average values of from 0.01 to 0.5, particularly preferably from 0.01 to 0.08, in particular from 0.02 to 0.04.

c preferably has average values of from 0.01 to 0.4, particularly preferably from 0.01 to 0.1, in particular from 0.02 to 0.06.

For the use of the suspensions of the invention as binders, it is important that the number of alkoxy groups borne by the pulverulent organopolysiloxane resins (A) is minimized, thus minimizing the amount of emissions. On the other hand, there have to be sufficient silanol groups in the resin to achieve an adequate curing rate for a continuous process, and to achieve adhesion to the fiber product.

The glass transition temperature of the organopolysiloxane resins (A) used according to the, invention is preferably in the range from 30 to 120° C., particularly preferably in the range from 30 to 80° C., in particular in the range from 40 to 65° C. For lower glass transition temperatures, there is the danger that the resin particles will undergo premature adhesive bonding in the suspension, and can therefore cause technical problems in the applications. At higher glass transition temperatures, the use as binders does not always give sufficient wetting, for example of the glass fiber surfaces, in the curing oven, to achieve the desired bond between the glass fibers. With regard to the definition of the glass transition temperature, determined by DSC measurements, for example, reference may in particular be made to the Rompp Chemical Encyclopedia, $9^{th}$ edition, G. Thieme Verlag Stuttgart, New York, 1990, p. 1587.

The organopolysiloxane resins (A) used according to the invention have a preferred weight-average molar mass $M_w$ of from 2000 to 50 000 g/mol (GPC, based on polystyrene).

The organopolysiloxane resins (A) used according to the ivention are commercially available products, or may be prepared by known processes, examples of the starting materials used being alkyltrialkoxysilanes, alkyltrihalosilanes, dialkyldialkoxysilanes, and/or dialkyldihalosilanes, and/or partial hydrolysates/condensates of these compounds. The molar proportion of monoalkylsilanes in this silicone resin synthesis is advantageously more than 80 mol %.

The organopolysiloxane resins (A) used according to the invention are solid at room temperature, and may be ground by known processes to give a powder. The particle size (volume-average) is preferably in the range from 10 to 50 μm, particularly preferably in the range from 20 to 40 μm.

The resin (A) used according to the invention is preferably a silicone resin of the formula

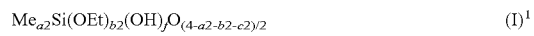

$$Me_{a2}Si(OEt)_{b2}(OH)_cO_{(4-a2-b2-c2)/2} \quad (I)^1$$

where Me is a methyl radical and Et is an ethyl radical, and where a2 assumes average values of from 0.9 to 1.1, b2 assumes average values of from 0.01 to 0.08, and c2 assumes average values of from 0.01 to 0.1, and the silicone resin has a glass transition temperature of from 30 to 80° C., and an average molar mass (based on polystyrene) of from 2000 to 50 000 g/mol. One way of obtaining these silicone resins is hydrolysis and condensation of methyltriethoxysilane.

Examples of resins (A) used according to the invention are $[CH_3SiO_{3/2}]_{32}[CH_3Si(OH)O_{2/2}]_3[CH_3Si(OC_2H_5)O_{2/2}]_2$
$[(CH_3)_2—SiO_{2/2}]_4$;

$[C_6H_5SiO_{3/2}]_{40}[CH_3SiO_{3/2}]_{35}[CH_3Si(OH)O_{2/2}]_2[CH_3Si(OC_2H_5)O_{2/2}]_3—[C_6H_5Si(OH)O_{2/2}]_2[C_6H_5Si(OC_2H_5)O_{2/2}]_2$;

$[CH_3SiO_{3/2}]_{210}[CH_3Si(OH)O_{2/2}]_5[CH_3Si(OC_2H_5)O_{2/2}]_3—[(CH_3)_2SiO_{2/2}]_5$;

$[CH_3SiO_{3/2}]_{89}[CH_3Si(OH)O_{2/2}]_5[CH_3Si(OCH_3)O_{2/2}]_4[SiO_{4/2}]_4—[HOSiO_{3/2}]_1[CH_3O\ SiO_{3/2}]_2$;

$[CH_3SiO_{3/2}]_{60}[CH_3Si(OH)O_{2/2}\ ]_5[CH_3Si(OCH_3)O_{2/2}]_4[SiO_{4/2}]_4—[CH_3OSiO_{3/2}]_2[(CH_3)_2SiO_{2/2}]_{10}[(CH_3)_2(CH_3O)SiO_{1/2}]_2—[(CH_3)_2(CH_2=CH)\ SiO_{1/2}]_4$;

$[C_2H_5SiO_{3/2}]_{200}[C_2H_5Si(OH)O_{2/2}]_{10}[C_2H_5Si(OC_2H_5)O_{2/2}]_3$;

$[CH_3SiO_{3/2}]_{500}[CH_3Si(OH)O_{2/2}]_{12}[CH_3Si(OC_2H_5)O_{2/2}]_8—[CH_3)_2SiO_{2/2}]_{10}—[(CH_3)_2(C_2H_5O)SiO_{1/2}]_4$, and $[CH_3SiO_{3/2}]_{320}[CH_3Si(OH)O_{2/2}]_{15}[CH_3Si(OC_2H_5)O_{2/2}]_4—[(CH_3)(H_2NC_3H_6)SiO_{2/2}]_4$.

Condensation catalysts (B) which may be used are any of the curing catalysts disclosed hitherto.

Organometallic compounds and amine catalysts may be used, but are not preferred for reasons of toxicology and environmental compatibility.

The catalyst (B) used preferably comprises siliconates and/or silanolates, particularly preferably those composed of from 1 to 100 units of the formula

$$R^4_g(R^5O)_h(M^+O^-)_iSiO_{(4-g-h-i)/2} \quad (II)$$

where $R^4$ may be identical or different, and is as defined for R,
$R^5$ may be identical or different, and is as defined for $R^1$,
$M^+$ may be identical or different, and is an alkali metal ion or an ammonium ion, in particular $Na^+$ or $K^+$,
g is 0, 1, 2, or 3, preferably 1,
h is 0, 1, 2, or 3, preferably 0, and
i is 0, 1, 2, or 3, preferably 1 or 2, with the proviso that the total of g, h and i is smaller than or equal to 4, and at least one radical $(M^+O^-)$ is present per molecule.

Examples, and preferred and particularly preferred ranges, for radical $R^4$ are the same as those given for radical R.

Examples, and preferred and particularly preferred ranges, for radical $R^5$ are the same as those given for radical $R^1$.

The siliconates and, respectively, silanolates used according to the invention preferably have from 1 to 10 units of the formula (II).

Examples of compounds composed of units of the formula (II) are $CH_3Si(O^-K^+)_2(OCH_3)$; $CH_3Si(O^-K^+)_3$; $C_6H_5Si(O^{-1}Na^+)_3$;

$C_2H_5Si(O^-NH_4^+)_3$, and condensation products thereof, such as $[CH_3Si(O^-Na^+)_2O_{1/2}]_2(CH_3Si(O^-Na^+)O_{2/2}]_5$;

$[CH_3SiO_{3/2}]_6[CH_3Si(O^-K^+)_2O_{1/2}]_2[CH_3Si(O^-K^+)O_{2/2}]_{20}$—$[CH_3Si(O^-K^+)(OC_2H_5)O_{1/2}]_2[CH_3Si(OC_2H_5)O_{2/2}]$.

The catalysts (B) used according to the invention are particularly preferably alkylsiliconates of sodium or of potassium, and/or the corresponding silanolates, in particular methylsiliconates of sodium or of potassium, and/or the corresponding silanolates.

The catalysts (B) are advantageously used in the form of aqueous solutions, in particular in the form of aqueous solutions of strength from 10 to 60% of methylsiliconates of sodium or of potassium, and/or the corresponding silanolates.

The catalysts (B) used according to the invention are commercially available products, or may be prepared by methods commonly used in silicone chemistry, e.g. in the case of the siliconates or silanolates, by dissolving the corresponding alkylsilicic acids or saponifying the corresponding silicic esters in concentrated solutions of alkali metal hydroxides.

The preferred amounts of curing catalysts (B) present in the suspensions of the invention are from 0.5 to 3 parts by weight per 100 parts by weight of silicone resin (A) used.

The anti-settling agents (C) which may be used according to the invention may be any of the inorganic antisettling agents and, respectively, thickeners disclosed hitherto. For example, the component (C) used in the suspensions of the invention may comprise synthetic amorphous silicas, or else (unmodified or modified) phyllosilicates, such as smectites, hectorites, .montmorillonites, and bentonites.

The antisettling agent (C) used where appropriate is preferably naturally occurring phyllosilicates, for example those activated by acids or bases and thus rendered swellable. Products of this type have previously been disclosed. By way of example, they have densities of from 1.5 to 4 g/cm$^3$, bulk densities of from 300 to 1000 g/l, average particle size of from 1 to 30 μm, and residual moisture content of from 5 to 15%. The pH of the dispersion of these thixotropic phyllosilicates is preferably greater than 8. Examples of these products are obtainable with the trade name Bentone® from the company Rheox, or Optigel® from the company Süd-Chemie AG, Germany.

The amounts of inorganic antisettling agents (C) preferably present in the suspensions of the invention are from 0.5 to 2 parts by weight per 100 parts of silicone resin (A) used.

Examples of the wetting agents (D) used according to the invention are anionic, cationic, and nonionic surfactants, preference being given to water-soluble nonionic surfactants, e.g. ethoxylated isotridecyl alcohols, ethoxylated fatty alcohols, and ethoxylated natural fats, other examples being surfactants having ethylene oxide units and. propylene oxide units, for example polyether polysiloxanes.

The wetting agents (D) used according to the invention are particularly preferably polyether polysiloxanes composed of units of the general formula $$(R^2O)_dSiG_eR^6_fO_{(4-d-e-f)/2} \quad (III),$$

where $R^6$ may be identical or different and is as defined for R, $R^2$ may be identical or different and is as defined for $R^1$, or is hydrogen, G may be identical or different and is a radical of the formula $$-(CH_2)_x(OC_yH_{2y})_zOR^3 \quad (IV)$$

where $R^3$ is a hydrogen atom, or an alkyl or acyl radical having from 1 to 4 carbon atoms, x is a number from 2 to 10, y may be 2, 3, or 4, and z is from 1 to 100, d is 0, 1, 2, or 3, its average preferably being from 0 to 0.5, e is 0, 1, 2, or 3, its average preferably being from 0.05 to 0.5, and f is 0, 1, 2, or 3, its average preferably being from 1.5 to 2.0, with the proviso that the sum d+e+f is smaller than or equal to 3, and that the siloxane composed of units of the formula (III) has at least one radical G.

In the polyether polysiloxanes which may be used according to the invention and which are composed of units of the general formula (III), the average value of the sum d+e+f is preferably from 1.8 to 2.2.

Examples, and preferred and particularly preferred ranges, for radical $R^6$ are the same as those given for radical R.

Examples, and preferred and particularly preferred ranges, for radical $R^2$ are the same as those given for radical $R^1$.

Examples of radicals G are $-(CH_2)_3(OC_2H_4)_{10}OH$, $-(CH_2)_6(OC_3H_6)_{10}OC(O)CH_3$, $-(CH_2)_3(OC_2H_4)_{20}(OC_3H_6)_{20}OC_4H_9$, $-(CH_2)_3(OC_4H_8)_7OCH_3$, $-(CH_2)_3(OC_2H_4)_{30}OH$, $-(CH_2)_3(OC_2H_4)_{10}OH$, $-(CH_2)_3O(C_2H_4O)_{16}-(C_3H_6O)_{13}-C_4H_9$, $-(CH_2)_3(OC_2H_4)_{10}OH$, and $-(CH_2)_3O(C_2H_4O)_{16}-(C_3H_6O)_{13}-C_4H_9$.

The polyether polysiloxanes used according to the invention and composed of units of the formula (III) are preferably $[(CH_3)_3SiO_{1/2}]_2[(CH_3)_2SiO]_{(0-300)}[(CH_3)(G)SiO]_{(1-100)}$ or $[(CH_3)_2(G)SiO_{1/2}]_2[(CH_3)_2](SiO)_{(0-300)}[(CH_3)(G)SiO]_{(0-100)}$, an example of G being one of the polyether radicals given above, such as $-(CH_2)_3O(C_2H_4O)_{16}-(C_3H_6O)_{13}-C_4H_9$.

Examples of the polyether polysiloxanes used according to the invention and composed of units of the formula (III) are $[(CH_3)_3SiO_{1/2}]_2[(CH_3)_2SiO]_{40}[(CH_3)(G)SiO]_7$;

$[(CH_3)_3SiO_{1/2}]_2[(CH_3)_2SiO]_{700}[(CH_3)(G)SiO]_7$;

$[(CH_3)_3SiO_{1/2}]_2[(CH_3)_2SiO]_8[(CH_3)(G)SiO]_4$, and $[(CH_3)_2(G)SiO_{1/2}]_2 [(CH_3)_2SiO]_{80}[(CH_3)(G)SiO]_{80}$, an example of G may be $-(CH_2)_3O(C_2H_4O)_{16}-(C_3H_6O)_{13}-C_4H_9$. However, use may also be made of polyether polysiloxanes whose polysiloxane skeleton has a branched structure.

The polyether polysiloxanes used according to the invention as component (D) may, for example for reasons associated with the preparation process, also contain non-polysiloxane-bonded polyether.

The wetting agents (D) used according to the invention and composed of units of the formula (III) are commercially available products, or may be prepared by methods commonly used in silicon chemistry.

The amounts of wetting agents (D) preferably present in the suspensions of the invention are from 0.1 to 2 parts by weight per 100 parts by weight of silicone resin (A) used. These amounts of component (D) advantageously permit very good dispersion of the silicone resin powder (A) in the suspension of the invention.

The suspensions of the invention preferably comprise amounts of from 100 to 2000 parts by weight of water, particularly preferably from 200 to 1000 parts by weight, based in each case on 100 parts by weight of silicone resin (A).

It is preferable for there to be no additives (F) present in the suspensions of the invention.

If additives (F) are present in the suspensions of the invention, the amounts are preferably from 0.01 to 10 parts by weight, particularly preferably from 0.1 to 1 part by weight, based in each case on 100 parts by weight of silicone resin (A).

Examples of additives (F) used, where appropriate, are adhesion promoters, such as tetraethoxysilane, octyltriethoxysilane, aminopropylaminoethyltriethoxy-silane, glycidoxypropyltrimethoxysilane, and hydrolysis/condensation products of these; preservatives, such as phenols and cresols, parabens, formaldehydes, formaldehyde depot substances, quaternary ammonium compounds, 2-bromo-2nitropropane-1,3-diol; dyes, such as crystal violet, rhodamine dyes, azo dyes; fragrances, and also polyorganosiloxanes not having the formula (I), for example polydimethylsiloxanes, and silicone resins which bear no alkoxy or hydroxy groups.

The organopolysiloxane suspension of the invention may be prepared by well known processes, for example by simple combining of the components. The catalyst (B) is advantageously added last. In another method of introducing the wetting agent (D), the wetting agent is applied to the antisettling agent (C), if this is used and if this is a solid inorganic carrier, and is metered in therewith.

Each of the components used according to the invention may be one type of that component, or else a mixture of at least two types of a particular component.

The organopolysiloxane suspensions of the invention preferably have thixotropic behavior, meaning that the viscosity at rest is markedly higher than the viscosity on exposure to a relatively high shear gradient. The dynamic viscosity of the suspension of the invention is preferably in the range from 50 to 2000 mPas, in particular in the range from 100 to 500 mPas, at 25° C., and with a shear gradient of 10/s.

The suspensions of the invention are preferably free from nitrogen-containing compounds.

The suspensions of the invention have the advantage of being capable of preparation by simple processes, and of having high storage stability.

The suspensions of the invention have the further advantage of being readily processable by a wide variety of processes, such as dipping, spraying, application by means of a doctor, and other methods, and may therefore particularly readily be adapted to various process systems.

The suspensions of the invention have the advantage of curing rapidly during processing, without emitting significant amounts of volatile organic compounds. These binders are therefore particularly compatible with the environment.

The suspensions of the invention may be used for any of the purposes for which suspensions of organopolysiloxanes have been used hitherto. They are particularly suitable as binders in processes for producing moldings from mineral fibers. However, other substrates may also be processed with the binder suspensions of the invention to give composite materials. Examples of these substrates are cellulose, paper, cotton, viscose fibers, polyamide fibers, acrylonitrile fibers, wool, wood flour, rock flour, wood wool, and wood particles.

The production of moldings from mineral fibers may involve any desired process of the prior art, the binders used comprising the suspensions of the invention instead of the binders usually used hitherto.

The invention also provides a process for producing moldings based on inorganic fibers, by adding binder to the fiber product, shaping the fiber product, and curing, which comprises using, as binder, the organopolysiloxane suspensions of the invention, where appropriate in a mixture with other components.

In a process of the invention, the binder suspension may be added to the fiber product by methods known hitherto, for example saturation or dipping of non-bonded mineral fibers, or by spray-application.

In principle, it is also possible, though not preferable, for the process of the also invention to use mixtures of the binder suspensions described above with silicone oil emulsions, silicone resin emulsions, and/or nanocomposites.

In one preferred embodiment of the process of the invention, the organopolysiloxane suspension of the invention is sprayed onto the fiber product after discharge from the furnace, and the treated fiber product is dried and shaped, and the organopolysiloxane resin is then cured.

The process of the invention preferably sprays the organopolysiloxane suspension of the invention continuously onto the fiber product, and known metering systems in conventional conveyor-belt plants may be used for this purpose.

The amount of organopolysiloxane suspension of the invention used to treat the fiber product in the process of the invention is preferably such that the silicone resin content of the treated fiber product is from 0.1 to 20% by weight, particularly preferably from 1 to 10% by weight, based in each case on the total weight of the inorganic fibers.

The dying step of the process of the invention is carried out at temperatures which are preferably from 100 to 500° C., particularly preferably from 150 to 350° C., and preferably at ambient atmospheric pressure, i.e. approximately at from 900 to 1100 hPa. The removal of water by the drying step is preferably terminated when the water content of the treated fiber product is smaller than 1%, particularly preferably smaller than 0.1%, based on the total weight of the treated inorganic fibers.

The shaping of the treated fiber product in the process of the invention is preferably compaction to the desired density.

The curing of the organopolysiloxane resin in the process of the invention preferably takes place at a temperature of from 100 to 500° C., particularly. preferably at from 150 to 350° C., and preferably at ambient atmospheric pressure, i.e. approximately at from 900 to 1100 hPa, e.g. through passage of hot air. The curing of the silicone resin may take place simultaneously with the drying-and shaping processes. However, it is also possible for the drying and the curing to be carried out as two separate steps in the process.

The mineral fibers used to produce the moldings of the invention may be any of the mineral fibers used hitherto for producing fiber structures, for example fibers obtained from silicatic melts.

Examples of inorganic fibers which may be used in the process of the invention are glass wool, basalt fiber, rock fiber, and slag fiber.

The wide variety of raw materials and additives, and also the various methods of fiber production from the melt, give access to fiber materials with a great variety of property profiles.

In one particularly preferred embodiment of the process of the invention, the organopolysiloxane suspension of the invention is sprayed continuously onto the mineral fibers which are still hot as they leave the furnace, drying the treated fiber product and bringing it to the desired density, and curing the silicone resin by heating, preferably through the passage of gases whose temperature is from 150 to 350° C., at ambient atmospheric pressure, i.e. at approximately from 900 to 1100 hPa.

The process of the invention has the advantage that the moldings of the invention may be produced simply by methods based on the process described in the prior art.

Another advantage of the process of the invention is that no undesired emissions arise during the process.

An advantage of the process of the invention is that the binder suspension of the invention achieves immediate uniform wetting of the inorganic fibers to be treated, thus permitting ideal development of the action of the binder.

An advantage of the process of the invention is that it provides a simple and efficient method of gaining access to heat-resistant moldings composed of mineral fibers, while excluding any possibility of production of significant amounts of volatile organic compounds during the production process.

The present invention also provides moldings produced from mineral fibers and from binders, wherein the binders used comprise the organopolysiloxane suspensions of the invention.

The density of the moldings of the invention is preferably from 5 to 300 kg/m$^3$, in particular from 10 to 80 kg/m$^3$.

In the moldings of the invention, the inorganic fibers have mainly been linked at points at intersections of the fibers, this being an important precondition for good mechanical properties, e.g. resilience.

The use of the hydrophobic silicone resin powder in the binder moreover gives the moldings of the invention particularly good water repellancy and water resistance.

An advantage of the moldings of the invention is that they have exceptional heat resistance and, when exposed to heat, do not produce emissions or discolor.

Another advantage of the moldings of the invention is that they are resistant to chemical and microbiological effects.

The moldings of the invention, or the moldings produced according to the invention, based on mineral fibers, may in particular be used wherever relatively high heat resistance is required. In buildings with particular fire-protection requirements they are particularly suitable for thermal insulation and sound deadening, and they are also suitable as insulating materials for household electrical devices, motor vehicles, or pipelines.

Unless otherwise stated, all of the data relating to parts and percentages in the examples below are based on weight. Unless otherwise stated, the examples below are carried out at ambient atmospheric pressure, i.e. at about 1000 hPa, and at room temperature, i.e. at about 20° C., or at a temperature which results from the combining of the reactants at room temperature with no additional heating or cooling. All of the viscosity data given in the examples are intended to relate to a temperature of 25° C.

The examples use the organopolysiloxane resins H1, H2, and H3 of the formula $$Me_{a1}Si(OEt)_{b1}(OH)_{c1}; O_{(4-a1-b1-c1)/2} \quad (I)'$$

where Me is a methyl radical and Et is an ethyl radical, the data for these being given in Table 1:

TABLE 1

| Resin | a1 | b1 | c1 | Glass transition temperature Tg [° C.] | Average molar mass Mw [g/mol] | Content of ethoxy groups in % by weight |
|---|---|---|---|---|---|---|
| H1 | 1.01 | 0.043 | 0.040 | 45 | 10710 | 2.80% |
| H2 | 1.02 | 0.020 | 0.061 | 62 | 5900 | 1.35% |
| H3 | 1.0 | 0.032 | 0.018 | 52 | 9100 | 2.18% |

The wetting agents (wetting aids) used in the examples below comprised a silicone surfactant of the formula $[(CH_3)_3SiO_{1/2}]_2[(CH_3)_2SiO]_{40}[(CH_3)(G)SiO]_7$ where G is a $—(CH_2)_3O(C_2H_4O)_{16}—(C_3H_6O)_{13}—C_4H_9$ radical, with a viscosity of 800 mPas, a cloud point of 30° C. (determined on a 10% strength solution in deionized water), and with a polyether content (polyethylene glycol/polypropylene glycol) of 80%.

EXAMPLE 1

Suspension S1

100 parts of silicone resin H1, ground to give a powder whose average particle diameter is 33 μm, 1 part of wetting agent, 2 parts of antisettling agent based on hectorites (commercially available as "Bentone® EW" from the company Rheox), and 1000 parts of water are stirred for 20 minutes, and then 2 parts of a 40% strength potassium methylsiliconate solution (commercially available as "Wacker BS® 15" from Wacker Chemie GmbH, Germany) are added. The viscosity of the resultant suspension was 50 mPas at a shear gradient of 10/s.

EXAMPLE 2

Suspension S2

100 parts of silicone resin H2, ground to give a powder whose average particle diameter is 35 μm, 1 part of wetting agent, 2 parts of antisettling agent described in Example 1, and 300 parts of water are stirred for 20 minutes, and then 2 parts of the 40% strength potassium methylsiliconate solution described in Example 1 are added. The viscosity of the suspension was 260 mPas at a shear gradient of 10/s.

EXAMPLE 3

Suspension S3

100 parts of silicone resin H3 ground to give a powder whose average particle diameter is 35 μm, 0.7 part of wetting aid, 5 parts of untreated fine-particle silica whose BET surface area is 380 m$^2$/g, and 400 parts of water are stirred for 20 minutes, and 5 parts of the 40% strength potassium methylsiliconate solution described in Example 1 are then added. The viscosity of the suspension was 500 mPas at a shear gradient of 10/s.

EXAMPLE 4

Suspension S4

100 parts of silicone resin H3, ground to give a powder whose average particle diameter is 32 µm, 1 part of wetting aid, 3 parts of antisettling agent described in Example 1, and 400 parts of water are stirred for 20 minutes, and then 2 parts of the 40% strength potassium methylsiliconate solution described in Example 1 are added. The viscosity of the suspension was 350 mPas at a shear gradient of 10/s.

EXAMPLE 5

Thermogravimetric Analysis

The binder suspensions S1–S4 prepared in Examples 1 to 4 were dried for 5 hours at 40° C. and 3 hPa in a vacuum drying cabinet, and heated for 3 minutes to 300° C. and a pressure of 1000 hPa. All of the binder specimens were colorless after this treatment. These specimens were further studied by thermogravimetric analysis over a temperature range up to 700° C. (heating rate 10° C. per minute). The results are shown in Table 2:

TABLE 2

| Suspension | Loss in weight in % at | | |
|---|---|---|---|
|  | 250° C. | 350° C. | 600° C. |
| S1 | 0.01 | 1.51 | 11.80 |
| S2 | 0.00 | 0.04 | 8.00 |
| S3 | 0.00 | 0.90 | 10.54 |
| S4 | 0.01 | 0.85 | 11.76 |

Surprisingly, practically no degradation of the binders takes place up to 350° C., and even at 600° C. the loss in weight observed from the binder is surprisingly small.

EXAMPLE 6

Glass fibers are produced continuously at 800 kg/h, using the rotary process, e.g. as described in Ullmann's Encyclopedia of Industrial Chemistry, 5$^{th}$ edn., Vol. A 11, p. 23 et seq. These are sprayed with 200 kg/h of the binder suspension S4 immediately after division into fibers by way of an annular die. The drying, molding, and curing processes take place on a conveyor belt at a belt speed of 12 m/min, and at a temperature of from 250 to 270° C. in the curing oven.

This gave colorless insulating materials with a thickness of 40 mm, an envelope density of 20 kg/m$^3$, and a covering of 5% of cured silicone resin, based on the total weight of the insulating material. The resultant insulating materials have low susceptibility to dusting, and have very good elastic performance (resilience).

What is claimed is:

1. An organopolysiloxane suspension comprising:
   (A) 100 parts by weight of a pulverulent organopolysiloxane resin comprising units of the formula $$R_aSi(OR^1)_b(OH)_cO_{(4-a-b-c)/2} \quad (I),$$

where
   R each are identical or different monovalent, SiC-bonded, and optionally substituted hydrocarbon radicals,
   R$^1$ each are identical or different alkyl radicals,
   a is 0, 1, 2, or 3, and on average 0.8 to 1.5,
   b is 0, 1, 2, or 3, and on average 0.01 to 0.5, and
   c is 0, 1, 2 or 3, and on average from 0.01 to 0.4 with the proviso that the sum a+b+c is ≦3, and that the organopolysiloxane resin comprising units of the formula (I) has at least one alkoxy radical and at least one hydroxy radical,
   (B) from 0.05 to 5 parts by weight of a condensation catalyst,
   (C) from 0 to 4 parts by weight of an inorganic anti-settling agent,
   (D) from 0.01 to 4 parts by weight of a wetting agent,
   (B) from 100 to 10,000 parts by weight of water, and
   (F) from 0 to 10 parts by weight each of adhesion promoters, polyorganosiloxanes other than those composed of units of the formula (I), preservatives, dyes, fragrances, and mixtures thereof.

2. The organopolysiloxane suspension of claim 1, wherein the glass transition temperature of the organopolysiloxane resin(s) (A) is in the range from 30° C. to 120° C.

3. The organopolysiloxane suspension of claim 1, wherein the catalyst (B) comprises at least one siliconate, silanolate, or a mixture thereof.

4. The organopolysiloxane suspension of claim 2, wherein the catalyst (B) used comprises at least one siliconate, silanolate, or a mixture thereof.

5. The organopolysiloxane suspension of claim 1, wherein the inorganic anti-settling agent (C) is present in an amount of from 0.5 to 2 parts by weight per 100 parts of silicone resin (A).

6. An organopolysiloxane suspension comprising:
   (A) 100 parts by weight of a pulverulent organopolysiloxane resin comprising units of the formula $$R_aSi(OR^1)_b(OH)_cO_{(4-a-b-c)/2} \quad (I),$$

where
   R each are identical or different monovalent, SiC-bonded, and optionally substituted hydrocarbon radicals,
   R$^1$ each are identical or different alkyl radicals,
   a is 0, 1, 2, or 3,
   b is 0, 1, 2, or 3, and
   c is 0, 1, 2 or 3,
   with the proviso that the sum a+b+c is ≦3, and that the organopolysiloxane resin comprising units of the formula (I) has at least one alkoxy radical and at least one hydroxy radical,
   (B) from 0.05 to 5 parts by weight of a condensation catalyst,
   (C) from 0 to 4 parts by weight of an inorganic anti-settling agent,
   (D) from 0.01 to 4 parts by weight of a wetting agent,
   (E) from 20 to 2,000 parts by weight of water, and
   (F) from 0 to 2 parts by weight each of adhesion promoters, polyorganosiloxanes other than those composed of units of the formula (I), preservatives, dyes, fragrances, and mixtures thereof, wherein the wetting agent (D) is a polyether polysiloxane comprising units of the general formula $$(R^2O)_dSiG_eR^6_fO_{(4-d-e-f)/2} \quad (III)$$

where
   R$^6$ are each identical or different radicals R,
   R$^2$ are each identical or different radicals R$^1$ or hydrogen,
   G are each identical or different radicals of the formula $$-(CH_2)_x(OC_yH_{2y})_zOR^3 \quad (IV)$$

where R$^3$ is a hydrogen atom, or an alkyl or acyl radical having from 1 to 4 carbon atoms,
   x is a number from 2 to 10,
   y is 2, 3, or 4, and z is from 1 to 100,
d is 0, 1, 2, or 3,
e is 0, 1, 2, or 3, and
f is 0, 1, 2, or 3,
with the proviso that the sum d+e+f is less than or equal to 3, and that the siloxane composed of units of the formula (III) has at least one radical G.

7. The organopolysiloxane suspension of claim 6, wherein d is on average 0 to 0.5, e is on average 0.05 to 0.5, and f is on average 1.5 to 2.0.

8. In a process for producing moldings containing inorganic fibers by adding binder to fibers to form an intermediate fiber product, shaping the intermediate fiber product, and curing, the improvement comprising selecting as a binder, an organopolysiloxane suspension of claim 1.

9. The process of claim 8, wherein the organopolysiloxane suspension is sprayed continuously onto mineral fibers which are still hot from their preparation, drying the resultant treated fiber product, compressing to the desired density, and curing the silicone resin by heating.

10. A molding produced from mineral fibers and from at least one binder, wherein the binder comprises at least one organopolysiloxane suspension of claim 1.

11. An organopolysiloxane suspension comprising:
(A) 100 parts by weight of a pulverulent organopolysiloxane resin comprising units of the formula $$R_a Si(OR^1)_b (OH)_c O_{(4-a-b-c)/2} \quad (I),$$

where
R each are identical or different monovalent, SiC-bonded, and optionally substituted hydrocarbon radicals,
$R^1$ each are identical or different alkyl radicals,
a is 0, 1, 2, or 3,
b is 0, 1, 2, or 3, and
c is 0, 1, 2 or 3,
with the proviso that the sum a+b+c is $\leq 3$, and that the organopolysiloxane resin comprising units of the formula (I) has at least one alkoxy radical and at least one hydroxy radical,
(B) from 0.05 to 5 parts by weight of a condensation catalyst comprising at least one of an ammonium, sodium, or potassium siliconate, or an ammonium, sodium, or potassium silanolate,
(C) a phyllosilicate anti-settling agent in an amount greater than 0 and less than 4 parts by weight,
(D) from 0.01 to 4 parts by weight of a wetting agent,
(E) from 100 to 10,000 parts by weight of water, and
(F) from 0 to 10 parts by weight each of adhesion promoters, polyorganosiloxanes other than those composed of units of the formula (I), preservatives, dyes, fragrances, and mixtures thereof.

12. An organopolysiloxane suspension comprising:
(A) 100 parts by weight of a pulverulent organopolysiloxane resin comprising units of the formula $$R_a Si(OR^1)_b (OH)_c O_{(4-a-b-c)/2} \quad (I),$$

where
R each are identical or different monovalent, SiC-bonded, and optionally substituted hydrocarbon radicals,
$R^1$ each are identical or different alkyl radicals,
a is 0, 1, 2, or 3,
b is 0, 1, 2, or 3, and
c is 0, 1, 2 or 3,
with the proviso that the sum a+b+c is 3, and that the organopolysiloxane resin comprising units of the formula (I) has at least one alkoxy radical and at least one hydroxy radical,
(B) a water soluble condensation catalyst in an amount 0.05 to 5 parts by weight, said condensation catalyst comprising at least one of an ammonium, sodium, or potassium siliconate, or an ammonium, sodium, or potassium silanolate
(C) from 0 to 4 parts by weight of an inorganic anti-settling agent,
(D) from 0.01 to 4 parts by weight of a wetting agent,
(B) from 20 to 2,000 parts by weight of water, and
(F) from 0 to 2 parts by weight each of adhesion promoters, polyorganosiloxanes other than those composed of units of the formula (I), preservatives, dyes, fragrances, and mixtures thereof.

13. The organopolysiloxane suspension of claim 1, wherein the catalyst (B) comprises an ammonium, sodium, or potassium siliconate, or an ammonium, sodium, or potassium silanolate.

14. The organopolysiloxane suspension of claim 1, wherein the glass transition temperature of the organopolysiloxane resin is from 40 to 85° C.

15. The organopolysiloxane suspension of claim 11, wherein the glass transition temperature of the organopolysiloxane resin is from 30 to 125° C.

16. The organopolysiloxane suspension of claim 12, wherein the glass transition temperature of the organopolysiloxane resin is from 30 to 125° C.

17. The organopolysiloxane suspension of claim 12, wherein the glass transition temperature of the organopolysiloxane resin is from 40 to 85° C.

18. A molding produced from mineral fibers and from at least one binder, wherein the binder comprises at least one organopolysiloxane suspension of claim 11.

19. A molding produced from mineral fibers and from at least one binder, wherein the binder comprises at least one organopolysiloxane suspension of claim 12.

* * * * *

UNITED STATES PATENT AND TRADEMARK OFFICE
CERTIFICATE OF CORRECTION

PATENT NO. : 7,081,275 B2 Page 1 of 1
APPLICATION NO. : 10/471954
DATED : July 25, 2006
INVENTOR(S) : Holger Rautschek et al.

It is certified that error appears in the above-identified patent and that said Letters Patent is hereby corrected as shown below:

Column 12, Line 10, Claim 1:
Delete "(B)" and insert therefor -- (E) --.

Column 12, Line 49, Claim 6:
Delete "from 20 to 2,000 parts" and insert therefor
-- from 100 to 10,000 parts --.

Column 12, Line 50, Claim 6:
Delete "from 0 to 2 parts" and insert therefor
-- from 0 to 10 parts --.

Column 14, Line 25, Claim 12:
Delete "(B) from 20 to 20,000 parts" and insert therefor
-- (E) from 100 to 10,000 parts --.

Column 14, Line 26, Claim 12:
Delete "from 0 to 2 parts" and insert therefor
-- from 0 to 10 parts --.

Signed and Sealed this

Twenty-first Day of November, 2006

JON W. DUDAS
*Director of the United States Patent and Trademark Office*